(12) United States Patent
Gass et al.

(10) Patent No.: US 8,438,958 B2
(45) Date of Patent: May 14, 2013

(54) DETECTION SYSTEM FOR POWER EQUIPMENT

(75) Inventors: Stephen F. Gass, Wilsonville, OR (US); Robert L. Chamberlain, Raleigh, NC (US); Benjamin B. Schramm, Los Gatos, CA (US); Joel F. Jensen, Redwood City, CA (US); Jonathan N. Betts-LaCroix, Chatsworth, CA (US)

(73) Assignee: SD3, LLC, Tualatin, OR (US)

( * ) Notice: Subject to any disclaimer, the term of this patent is extended or adjusted under 35 U.S.C. 154(b) by 0 days.

(21) Appl. No.: 13/374,290

(22) Filed: Dec. 19, 2011

(65) Prior Publication Data

US 2012/0167732 A1 Jul. 5, 2012

Related U.S. Application Data

(60) Continuation of application No. 11/796,819, filed on Apr. 30, 2007, now Pat. No. 8,079,292, which is a division of application No. 09/929,426, filed on Aug. 13, 2001, now Pat. No. 7,210,383, which is a continuation of application No. 12/214,562, filed on Jun. 20, 2008, now Pat. No. 8,079,295.

(60) Provisional application No. 60/225,056, filed on Aug. 14, 2000, provisional application No. 60/225,057, filed on Aug. 14, 2000, provisional application No. 60/225,058, filed on Aug. 14, 2000, provisional application No. 60/225,059, filed on Aug. 14, 2000, provisional application No. 60/225,089, filed on Aug. 14, 2000, provisional application No. 60/225,094, filed on Aug. 14, 2000, provisional application No. 60/225,169, filed on Aug. 14, 2000, provisional application No. 60/225,170, filed on Aug. 14, 2000, provisional application No. 60/225,200, filed on Aug. 14, 2000, provisional application No. 60/225,201, filed on Aug. 14, 2000, provisional application No. 60/225,206, filed on Aug. 14, 2000, provisional application No. 60/225,210, filed on Aug. 14, 2000, provisional application No. 60/225,211, filed on Aug. 14, 2000, provisional application No. 60/225,212, filed on Aug. 14, 2000.

(51) Int. Cl.
*B26D 5/00* (2006.01)

(52) U.S. Cl.
USPC ... 83/62; 83/62.1; 83/63; 83/76.8; 83/522.12; 83/DIG. 1; 192/129 R

(58) Field of Classification Search ............... 83/DIG. 1, 83/58, 62, 62.1, 63, 72, 76.7, 788, 581, 471.2, 83/477.1, 477.2, 522.12, 526, 397.1; 144/154.5, 144/356, 384, 391, 427, 286.5; 29/708, 254, 29/413; 324/550, 424; 408/5; 56/10.9, 11.3; 192/192 A, 129 R, 130; 102/202.7; 89/1.56; 137/68.12, 137/72, 76; 188/5, 6, 110, 189; 169/57, 59, 169/42, DIG. 3; 74/2; 403/2, 28; 411/2, 39, 411/390; 335/1, 242, 132; 318/362; 241/32.5; 337/239, 148, 1, 5, 10, 17, 140, 170, 190, 337/237, 401, 290, 404, 405; 218/2, 154; 307/639, 307/328, 115, 326, 142, 117, 126, 131; 451/409; 280/806; 297/480; 187/69, 77, 89, 189, 216, 187/166, 72.3; 340/679, 680, 686.1, 687, 340/686.3, 686.6

See application file for complete search history.

(56) References Cited

U.S. PATENT DOCUMENTS

| | | | |
|---|---|---|---|
| 1,551,900 | A | 9/1925 | Morrow |
| 2,554,124 | A | 5/1951 | Salmont |

(Continued)

FOREIGN PATENT DOCUMENTS

| | | |
|---|---|---|
| DE | 76186 | 8/1921 |
| DE | 4235161 | 5/1993 |

(Continued)

OTHER PUBLICATIONS

Gordon Engineering Corp., Product Catalog, pp. cover, 1, 3 and back, Brookfield, Connecticut, US, Oct. 1997.

*Primary Examiner* — Jason Daniel Prone

(57) ABSTRACT

Woodworking machines including conductive cutters adapted to cut workpieces, and motors adapted to drive the cutters are disclosed. The machines also include a contact detection system adapted to detect contact between a person and the cutter, and to distinguish contact between the person and the cutter from contact between the workpiece and the cutter. The machines further include a reaction system adapted to cause a predetermined action to take place upon detection of contact between the person and the cutter by the contact detection system.

4 Claims, 12 Drawing Sheets

U.S. PATENT DOCUMENTS

| | | |
|---|---|---|
| 3,547,232 A | 12/1970 | Fergle |
| 3,785,230 A | 1/1974 | Lokey |
| 3,829,850 A | 8/1974 | Guetersloh |
| 3,858,095 A | 12/1974 | Friemann et al. |
| 3,953,770 A | 4/1976 | Hayashi |
| 4,048,886 A | 9/1977 | Zettler |
| 4,117,752 A | 10/1978 | Yoneda |
| 4,190,000 A | 2/1980 | Shaull et al. |
| 4,453,112 A | 6/1984 | Sauer et al. |
| 4,589,047 A | 5/1986 | Gaus et al. |
| 4,722,021 A | 1/1988 | Hornung et al. |
| 4,792,965 A | 12/1988 | Morgan |
| 4,965,909 A | 10/1990 | McCullough et al. |
| 5,081,406 A | 1/1992 | Hughes et al. |
| 5,198,702 A | 3/1993 | McCullough et al. |
| 5,231,359 A | 7/1993 | Masuda et al. |
| 5,272,946 A | 12/1993 | McCullough et al. |
| 5,341,133 A | 8/1994 | Savoy et al. |
| 5,602,734 A | 2/1997 | Kithil |
| 5,730,165 A | 3/1998 | Philipp |
| 5,880,954 A | 3/1999 | Thomson et al. |
| 5,921,367 A | 7/1999 | Kashioka et al. |
| 5,942,975 A | 8/1999 | Sorensen |
| 6,064,629 A | 5/2000 | Stringer et al. |
| 6,095,092 A | 8/2000 | Chou |
| 6,150,826 A | 11/2000 | Hokodate et al. |
| 6,257,061 B1 | 7/2001 | Nonoyama et al. |
| 6,366,099 B1 | 4/2002 | Reddi |
| 6,376,939 B1 | 4/2002 | Suzuki et al. |
| 6,492,802 B1 | 12/2002 | Bielski |
| 6,757,602 B2 | 6/2004 | Breed et al. |
| 6,857,345 B2 | 2/2005 | Gass et al. |
| 6,922,153 B2 | 7/2005 | Pierga et al. |
| 7,055,417 B1 | 6/2006 | Gass |
| 7,077,039 B2 | 7/2006 | Gass et al. |
| 7,171,879 B2 | 2/2007 | Gass et al. |
| 7,173,537 B2 | 2/2007 | Voigtlaender |
| 7,197,969 B2 | 4/2007 | Gass et al. |
| 7,210,383 B2 | 5/2007 | Gass et al |
| 7,377,199 B2 | 5/2008 | Gass et al. |
| 7,421,932 B1 | 9/2008 | Heinzmann et al. |
| 7,481,140 B2 | 1/2009 | Gass et al. |
| 7,536,238 B2 | 5/2009 | Gass |
| 7,591,210 B2 | 9/2009 | Gass et al. |
| 7,617,752 B2 | 11/2009 | Gass et al. |
| 7,707,918 B2 | 5/2010 | Gass et al. |
| 7,827,889 B2 | 11/2010 | Carrier |
| 7,895,927 B2 | 3/2011 | Gass |
| 7,900,541 B2 | 3/2011 | Gass et al. |
| 7,971,613 B2 | 7/2011 | Gass et al. |
| 7,991,503 B2 * | 8/2011 | Gass .............................. 144/427 |
| 8,051,758 B2 * | 11/2011 | Eppard ........................ 83/62.1 |
| 8,065,943 B2 * | 11/2011 | Gass et al. ..................... 83/62 |
| 8,079,292 B2 * | 12/2011 | Gass et al. ..................... 83/62 |
| 8,186,256 B2 * | 5/2012 | Carrier .............................. 83/63 |
| 8,316,547 B2 * | 11/2012 | Hecht et al. .................. 30/166.3 |
| 2003/0090224 A1 | 5/2003 | Gass et al. |
| 2005/0155473 A1* | 7/2005 | Gass ............................. 83/62.1 |
| 2010/0023137 A1 | 1/2010 | Gass |
| 2010/0083804 A1 | 4/2010 | Gass et al. |
| 2010/0132524 A1 | 6/2010 | Gass et al. |
| 2011/0023670 A1 | 2/2011 | Gass |
| 2011/0023673 A1 | 2/2011 | Gass |
| 2011/0061769 A1 | 3/2011 | Gass |
| 2011/0072942 A1 | 3/2011 | Gass |
| 2011/0079124 A1 | 4/2011 | Carrier |
| 2012/0186699 A1* | 7/2012 | Gass ............................. 144/382 |

FOREIGN PATENT DOCUMENTS

| | | |
|---|---|---|
| DE | 4326313 | 2/1995 |
| DE | 19609771 | 6/1998 |
| EP | 0362937 | 4/1990 |
| EP | 1961525 A1 * | 8/2008 |
| WO | WO 01/26064 | 4/2001 |

OTHER PUBLICATIONS

Analog Devices, Inc., 3-Axis Capacitive Sensor—Preliminary Technical Data AD7103, pp. 1-40, © 1998.

*Microelectronic Circuits*, Sedra et al., pp. 995-997, 1998.

* cited by examiner

DETECTION SYSTEM FOR POWER EQUIPMENT

CROSS-REFERENCE TO RELATED APPLICATIONS

This application is a continuation of U.S. patent application Ser. No. 11/796,819, filed Apr. 30, 2007, issuing as U.S. Pat. No. 8,079,292 on Dec. 20, 2011, which in turn is a division of U.S. patent application Ser. No. 09/929,426, filed Aug. 13, 2001, now U.S. Pat. No. 7,210,383, which in turn claimed the benefit of and priority from the following U.S. Provisional Patent Application Ser. No. 60/225,056, filed Aug. 14, 2000, Ser. No. 60/225,057, filed Aug. 14, 2000, Ser. No. 60/225,058, filed Aug. 14, 2000, Ser. No. 60/225,059, filed Aug. 14, 2000, Ser. No. 60/225,089, filed Aug. 14, 2000, Ser. No. 60/225,094, filed Aug. 14, 2000, Ser. No. 60/225,169, filed Aug. 14, 2000, Ser. No. 60/225,170, filed Aug. 14, 2000, Ser. No. 60/225,200, filed Aug. 14, 2000, Ser. No. 60/225,201, filed Aug. 14, 2000, Ser. No. 60/225,206, filed Aug. 14, 2000, Ser. No. 60/225,210, filed Aug. 14, 2000, Ser. No. 60/225,211, filed Aug. 14, 2000, and Ser. No. 60/225,212, filed Aug. 14, 2000.

This application is also a continuation of U.S. patent application Ser. No. 12/214,562, filed Jun. 20, 2008, issuing as U.S. Pat. No. 8,079,295 on Dec. 20, 2011.

All of the above-identified applications and patents are hereby incorporated by reference.

FIELD OF THE INVENTION

The present invention relates to detection of human contact and more particularly to a system for detecting human contact with a portion of a piece of power equipment.

BACKGROUND OF THE INVENTION

Every day, hundreds of people are injured while operating power equipment of various kinds. Numerous systems have been proposed to make operation of power equipment safer. The simplest systems are guards that physically block the user from reaching dangerous portions of the equipment. Such guards are most effective around chains, belts and other portions of the drive system that can be made inaccessible without impairing operation of the machine. However, the most dangerous portion of power equipment is often the portion into which a user must feed material for processing. It is not possible to block access to such areas while still allowing the user to operate the machine. Therefore, a different form of protection must be provided for operational zones.

To protect the user against accidental injury in operational zones machines have been equipped with various systems to detect the presence of a user, or a user's extremity, in a dangerous area and take some precautionary action. For instance, some systems require a user to place each hand on a switch remote from the danger zone before the machine will operate. With proper placement of the switches, the user cannot have their hands in the danger zone and still actuate the machine. Unfortunately, users often bypass the switches and are injured as a result. Other systems utilize a radio frequency field to detect the proximity of a user to the operation area and inhibit operation if a human presence is detected. Still other systems utilize a conductive glove worn by a user. When the glove comes into contact with a dangerous element of the machine, the machine is stopped to minimize or eliminate injury.

All such systems suffer from a number of drawbacks, particularly when used on woodworking equipment. First, in woodworking equipment, the user often must move or hold the work piece during the processing operation. As a result, the user's hands must pass close to the cutting tool. Therefore, systems that rely on proximity detection are not sufficiently reliable. Systems utilizing a conductive glove are generally inconvenient, and in the case of many pieces of equipment, would not provide sufficient protection if the machine is simply turned off when contact is detected.

DETAILED DESCRIPTION AND BEST MODE OF THE INVENTION

Figure 1:
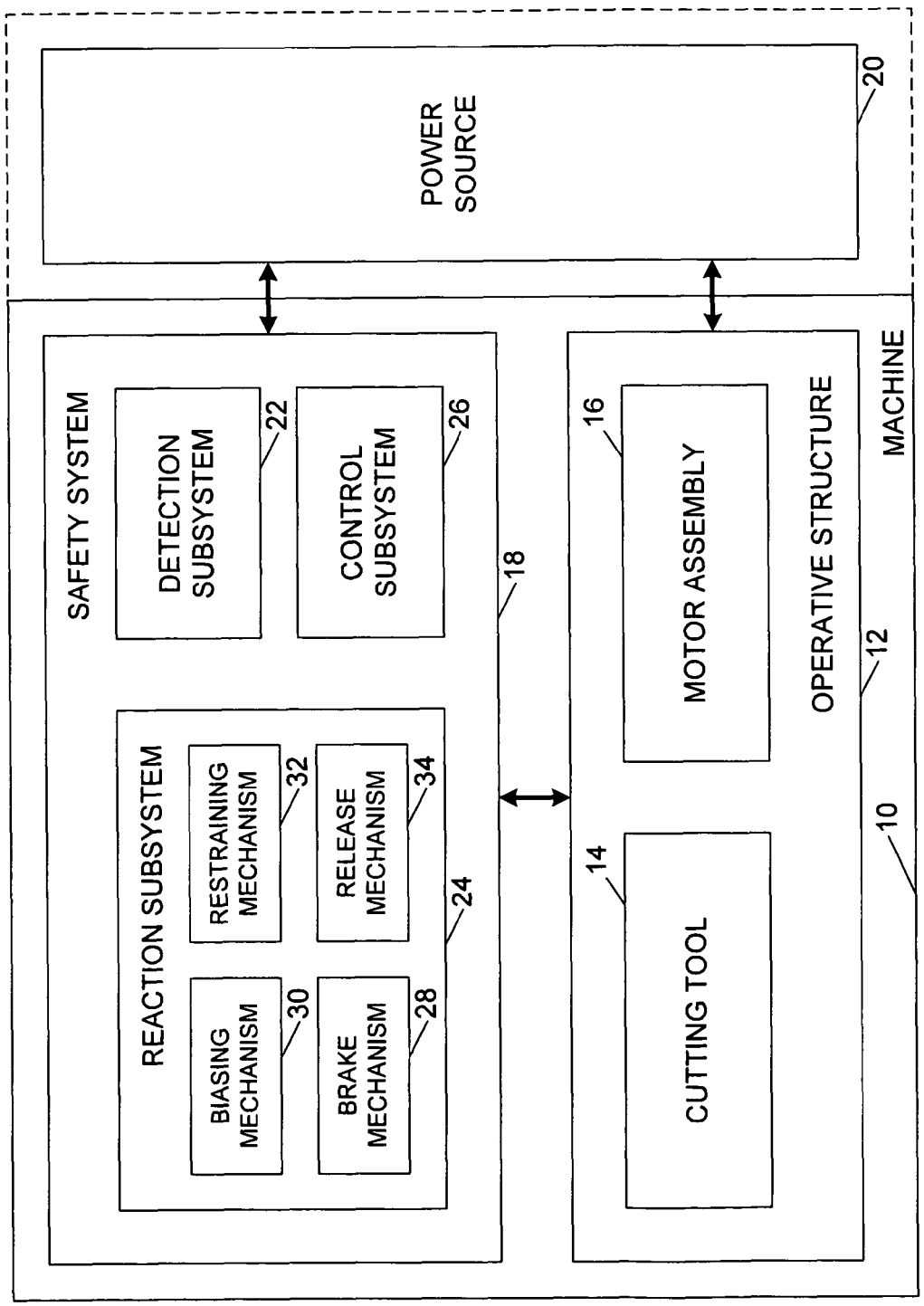
FIG. 1 is a schematic block diagram of a machine with a fast-acting safety system according to the present invention.

A machine according to the present invention is shown schematically in FIG. 1 and indicated generally at 10. Machine 10 may be any of a variety of different machines adapted for cutting workpieces, such as wood, including a table saw, miter saw (chop saw), radial arm saw, circular saw, band saw, jointer, planer, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14.

Motor assembly 16 includes one or more motors adapted to drive cutting tool 14. The motors may be either directly or indirectly coupled to the cutting tool, and may also be adapted to drive workpiece transport mechanisms. Cutting tool 14 typically includes one or more blades or other suitable cutting implements that are adapted to cut or remove portions from the workpieces. The particular form of cutting tool 14 will vary depending upon the various embodiments of machine 10. For example, in table saws, miter saws, circular saws and radial arm saws, cutting tool 14 will typically include one or more circular rotating blades having a plurality of teeth disposed along the perimetrical edge of the blade. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, filed Feb. 16, 2000, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, filed Aug. 14, 2000, the disclosure of which is herein incorporated by reference. Retraction of the cutting tool from its operating position is described in more detail in U.S. Provisional Patent Application Ser. No. 60/225,089, filed Aug. 14, 2000, the disclosure of which is herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
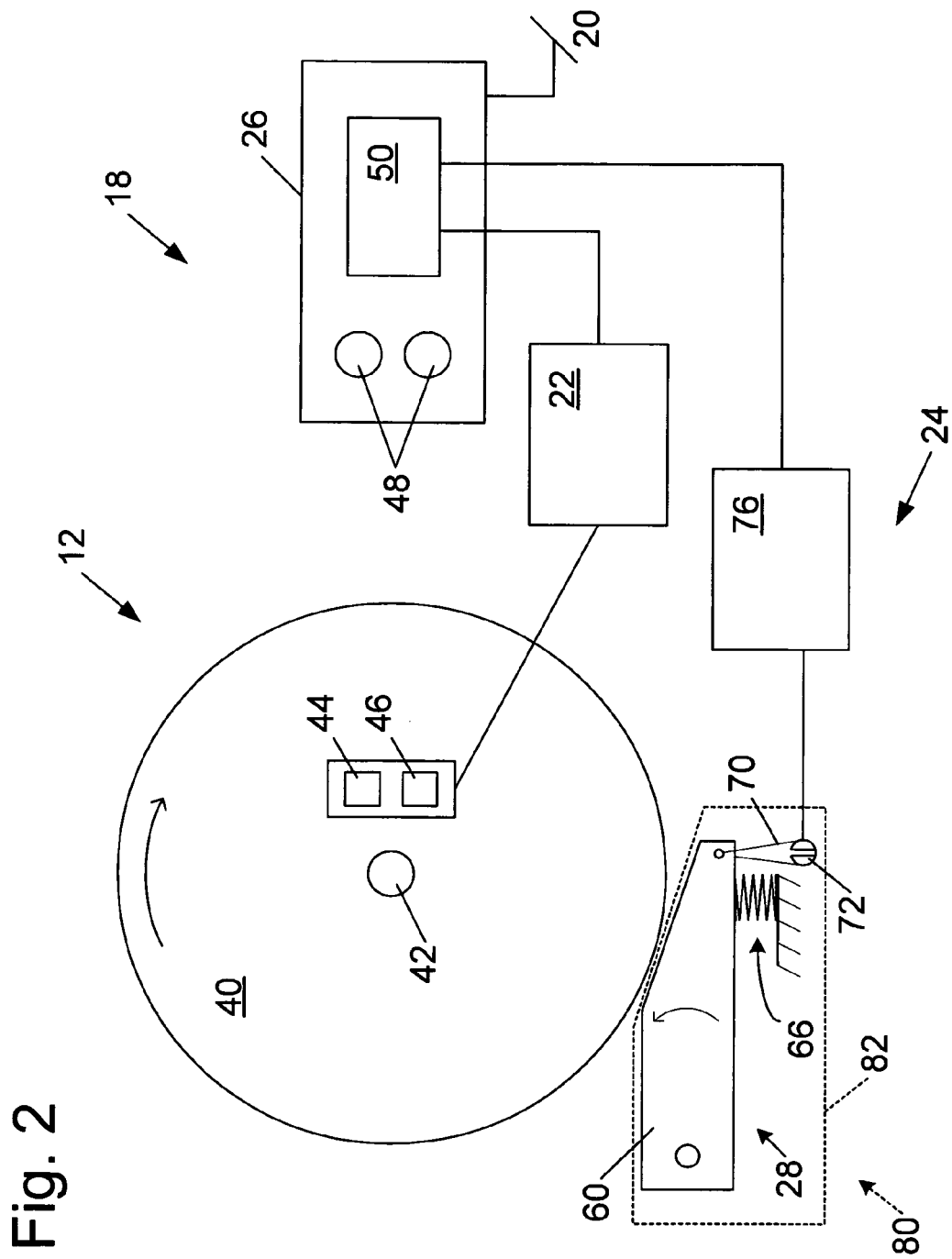
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a cutting tool in the form of a circular blade 40 mounted on a rotating shaft or arbor 42. Blade 40 includes a plurality of cutting teeth (not shown) disposed around the outer edge of the blade. As described in more detail below, brake mechanism 28 is adapted to engage the teeth of blade 40 and stop the rotation of the blade. U.S. Provisional Patent Application Ser. No. 60/225,210, filed Aug. 14, 2000, the disclosure of which is herein incorporated by reference, describes other systems for stopping the movement of the cutting tool. U.S. Provisional Patent Application Ser. No. 60/225,057, filed Aug. 14, 2000, and U.S. Provisional Patent Application Ser. No. 60/225,058, filed Aug. 14, 2000, the disclosures of which are herein incorporated by reference, describe safety system 18 in the context of particular types of machines 10.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14, is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail below, and in U.S.

Provisional Patent Application Ser. No. 60/225,211, filed Aug. 14, 2000, the disclosure of which is herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, filed Aug. 14, 2000, and U.S. Provisional Patent Application Ser. No. 60/225,094, filed Aug. 14, 2000, the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 might also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately ¹⁄₃₂-inch to ¼-inch from the edge of the blade by fusible member 70, however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, filed Aug. 14, 2000, U.S. Provisional Patent Application Ser. No. 60/225,169, filed Aug. 14, 2000, and U.S. Provisional Patent Application Ser. No. 60/225,170, filed Aug. 14, 2000, the disclosures of which are herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, filed Aug. 14, 2000, and U.S. Provisional Patent Application Ser. No. 60/225,212, filed Aug. 14, 2000, the disclosures of which are herein incorporated by reference.

While one particular implementation of safety system 18 has been described, it will be appreciated that many variations and modifications are possible within the scope of the invention. Many such variations and modifications are described in U.S. Provisional Patent Application Ser. No. 60/182,866, filed Feb. 16, 2000 and U.S. Provisional Patent Application Ser. No. 60/157,340, filed Oct. 1, 1999, the disclosures of which are herein incorporated by reference.

Figure 3:
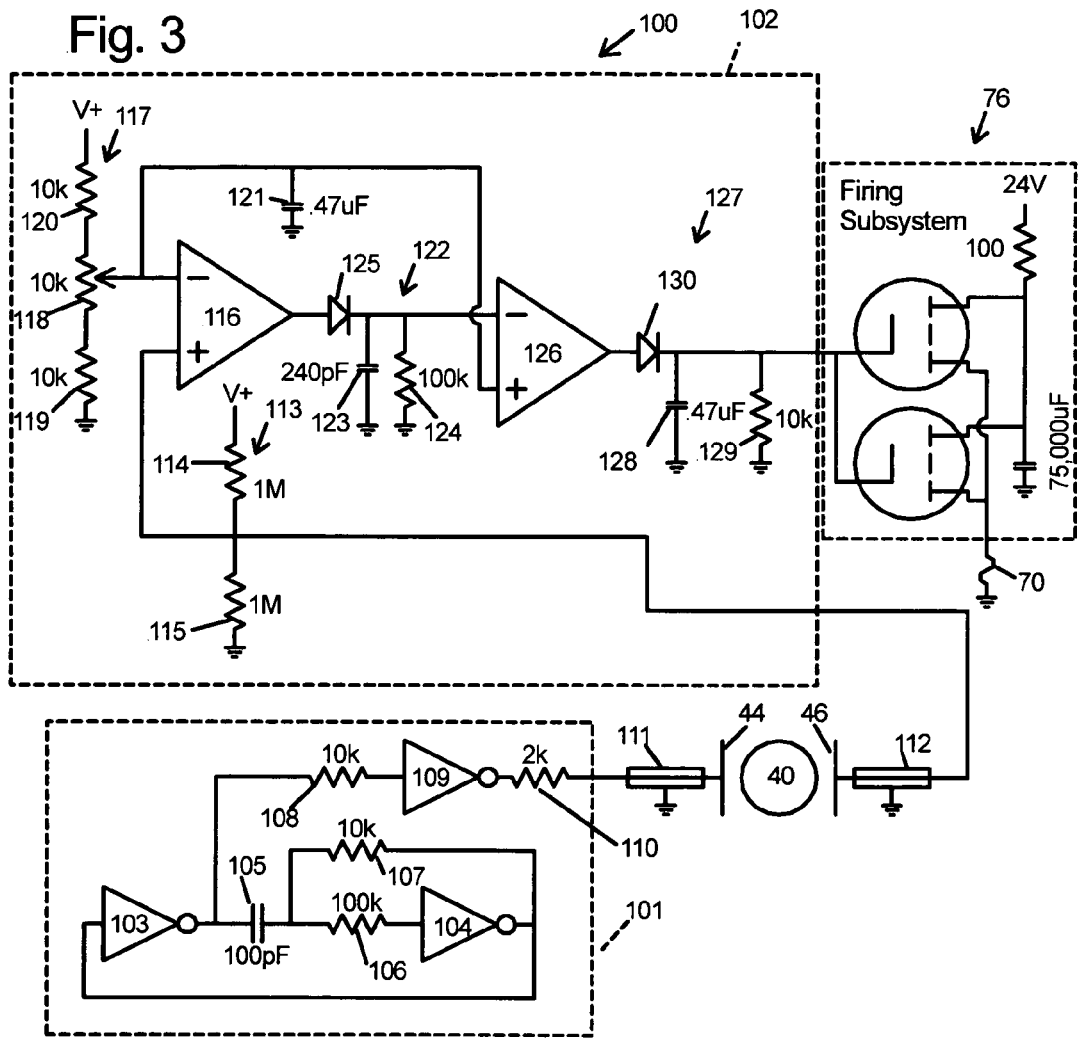
FIG. 3 is a schematic circuit diagram of an electronic subsystem for the safety system of FIG. 1, including an excitation system, a contact sense system and a firing system.

One example of an electronic subsystem 100 of contact detection subsystem 22 according to the present invention is illustrated in more detail in FIG. 3. Electronic subsystem 100 is adapted to work with the two-plate capacitive coupling system described in U.S. Provisional Patent Application Ser. No. 60/225,211, filed Aug. 14, 2000. Electronic subsystem 100 includes an excitation system 101 and a monitoring or contact sensing system 102. However, it will be appreciated by those of skill in the electrical arts that the exemplary configuration of electronic subsystem 100 illustrated in FIG. 3 is just one of many configurations which may be used. Thus, it will be understood that any suitable embodiment or configuration could be used within the scope of the invention.

As shown in FIG. 3, excitation system 101 includes an oscillator circuit that generates a wave input signal, such as a square wave signal, at a frequency of approximately 200 khz and voltage amplitude of 12 volts. Alternatively, excitation system 101 may be configured to generate a signal of a different frequency and/or a different amplitude and/or different waveform. The oscillator is formed by a pair of inverters 103, 104 from a CD4040 configured as a bistable oscillator. The output of inverter 103 is connected to a 100 pF capacitor 105, which is connected through a 100 kΩ resistor 106 to the input of inverter 104. A 10 kΩ resistor 107 is connected between the output of inverter 104 and the junction between capacitor 105 and resistor 106. The output of inverter 104 is connected to the input of inverter 103. A 10 kΩ resistor 108 connects the output of inverter 103 to the input of another inverter 109, which serves as an output buffer to drive the input wave signal onto the blade. A 2 kΩ series resistor 110 functions to reduce any ringing in the input signal by damping the high frequency components of the signal.

It will be appreciated that the particular form of the oscillator signal may vary and there are many suitable waveforms and frequencies that may be utilized. The waveform may be chosen to maximize the signal-to-noise ratio, for example, by selecting a frequency at which the human body has the lowest resistance or highest capacitance relative to the workpiece being cut. As an additional variation, the signal can be made asymmetric to take advantage of potentially larger distinctions between the electrical properties of human bodies and green wood at high frequency without substantially increasing the radio-frequency power radiated. For instance, utilizing a square wave with a 250 khz frequency, but a duty cycle of five percent, results in a signal with ten times higher frequency behavior than the base frequency, without increasing the radio-frequency energy radiation. In addition, there are many different oscillator circuits that are well known in the art and which would also be suitable for generating the excitation signal.

The input signal generated by the oscillator is fed through a shielded cable 111 onto charge plate 44. Shielded cable 111 functions to insulate the input signal from any electrical noise present in the operating environment, insuring that a "clean" input signal is transmitted onto charge plate 44. Also, the shielded cable reduces cross talk between the drive signal and the detected signal that might otherwise occur should the cables run close together. Alternatively, other methods may be used to prevent noise in the input signal. As a further alternative, monitoring system 102 may include a filter to remove any noise in the input signal or other electrical noise detected by charge plate 46. Shielded cable 111 also reduces radio-frequency emissions relative to an unshielded cable.

As described in more detail in U.S. Provisional Patent Application Ser. No. 60/225,211, filed Aug. 14, 2000, the input signal is coupled from charge plate 44 to charge plate 46 via blade 40. As shown in FIG. 3, the signal received on charge plate 46 is then fed via shielded cable 112 to monitoring system 102. The monitoring system is configured to detect a change in the signal due to contact between the user's body and the blade. It will be appreciated that monitoring system 102 may be implemented in any of a wide variety of designs and configurations. In the exemplary embodiment depicted in FIG. 3, monitoring system 102 compares the amplitude of the input signal received at charge plate 46 to a determined reference voltage. In the event that the input signal received at charge plate 46 falls below the reference voltage for a determined time, the monitoring system produces an output signal to reaction subsystem 24. The reaction subsystem is configured to receive the output signal and immediately act to stop the blade.

The particular components of monitoring system 102 may vary depending on a variety of factors including the application, the desired sensitivity, availability of components, type of electrical power available, etc. In the exemplary embodiment, shielded cable 112 is connected between charge plate 46 and a voltage divider 113. Voltage divider 113 is formed by two 1MΩ resistors 114, 115 connected in series between the supply voltage (typically about 12 volts) and ground: The voltage divider functions to bias the output signal from charge plate 46 to an average level of half of the supply voltage. The biased signal is fed to the positive input of an op-amp 116. Op-amp 116 may be any one of many suitable op-amps that are well known in the art. An example of such an op-amp is a TL082 op-amp. The negative input of the op-amp is fed by a reference voltage source 117. In the exemplary embodiment, the reference voltage source is formed by a 10 kΩ potentiometer 118 coupled in series between two 10 kΩ resistors 119, 120, which are connected to ground and the supply voltage, respectively. A 0.47 µF capacitor 121 stabilizes the output of the reference voltage.

As will be understood by those of skill in the art, op-amp 116 functions as a comparator of the input signal and the reference voltage. Typically, the voltage reference is adjusted so that its value is slightly less than the maximum input signal voltage from charge plate 46. As a result, the output of the op-amp is low when the signal voltage from the charge plate is less than the reference voltage and high when the signal voltage from the charge plate is greater than the reference voltage. Where the input signal is a periodic signal such as the square wave generated by excitation system 101, the output of op-amp 116 will be a similar periodic signal. However, when a user contacts the blade, the maximum input signal voltage decreases below the reference voltage and the op-amp output no longer goes high.

The output of op-amp 116 is coupled to a charging circuit 122. Charging circuit 122 includes a 240 pF capacitor 123 that is connected between the output of op-amp 116 and ground. A 100 kΩ discharge resistor 124 is connected in parallel to capacitor 123. When the output of op-amp 116 is high, capacitor 123 is charged. Conversely, when the output of op-amp 116 is low, the charge from capacitor 123 discharges through resistor 124 with a time constant of approximately 24 µs. Thus, the voltage on capacitor 123 will discharge to less than half the supply voltage in approximately 25-50 µs is unless the capacitor is recharged by pulses from the op-amp. A diode 125 prevents the capacitor from discharging into op-amp 116. Diode 125 may be any one of many suitable diodes that are well known in the art, such as a 1N914 diode. It will be appreciated that the time required for capacitor 123 to discharge may be adjusted by selecting a different value capacitor or a different value resistor 124.

As described above, charging circuit 122 will be recharged repeatedly and the voltage across capacitor 123 will remain high so long as the detected signal is received substantially unattenuated from its reference voltage at op-amp 116. The voltage from capacitor 123 is applied to the negative input of an op-amp 126. Op-amp 126 may be any one of many suitable op-amps, which are well known in the art, such as a TL082 op-amp. The positive input of op-amp 126 is tied to a reference voltage, which is approximately equal to one-half of the supply voltage. In the exemplary embodiment depicted in FIG. 3, the reference voltage is provided by reference voltage source 117.

So long as charging circuit 122 is recharged, the output of op-amp 126 will be low. However, if the output of op-amp 116 does not go high for a period of 25-50 µs, the voltage across capacitor 123 will decay to less than the reference voltage, and op-amp 126 will output a high signal indicating contact between the user's body and the blade. As described in U.S. Provisional Patent Application Ser. No. 60/225,056, filed Aug. 14, 2000, U.S. Provisional Patent Application Ser. No. 60/225,169, filed Aug. 14, 2000, and U.S. Provisional Patent Application Ser. No. 60/225,170, filed Aug. 14, 2000, the output signal from op-amp 126 is coupled to actuate reaction subsystem 24 and stop the blade. The time between contact and activation of the reaction system can be adjusted by selecting the time constant of capacitor 123 and resistor 124.

It should be noted that, depending on the size, configuration and number of teeth on the blade and the position of contact with the operator, the electrical contact between the operator and blade will often be intermittent. As a result, it is desirable that the system detect contact in a period less than or equal to the time a single tooth would be in contact with a user's finger or other body portion. For example, assuming a 10-inch circular blade rotating at 4000 rpm and a contact distance of about one-quarter of an inch (the approximate width of a fingertip), a point on the surface of the blade, such as the point of a tooth, will be in contact with the user for approximately 100 µs. After this period of contact, there will normally be an interval of no contact until the next tooth reaches the finger. The length of the contact and non-contact periods will depend on such factors as the number of teeth on the blade and the speed of rotation of the blade.

It is preferable, though not necessary, to detect the contact with the first tooth because the interval to the second tooth may be substantial with blades that have relatively few teeth. Furthermore, any delay in detection increases the depth of cut that the operator will suffer. Thus, in the exemplary embodiment, the charging circuit is configured to decay within approximately 25-50 µs to ensure that monitoring system 102 responds to even momentary contact between the user's body and the blade. Further, the oscillator is configured to create a 200 khz signal with pulses approximately every 5 µs. As a result, several pulses of the input signal occur during each period of contact, thereby increasing the reliability of contact detection. Alternatively, the oscillator and charging circuit may be configured to cause the detection system to respond more quickly or more slowly. Generally, it is desirable to maximize the reliability of the contact detection, while minimizing the likelihood of erroneous detections.

As described above, the contact between a user's body and the teeth of blade 64 might be intermittent depending on the size and arrangement of the teeth. Although monitoring system 102 typically is configured to detect contact periods as short as 25-50 µs, once the first tooth of the blade passes by the user's body, the contact signal received by the second electrical circuit may return to normal until the next tooth contacts the user's body. As a result, while the output signal at op-amp 126 will go high as a result of the first contact, the output signal may return low once the first contact ends. As a result, the output signal may not remain high long enough to activate the reaction system. For instance, if the output signal does not remain high long enough to actuate firing subsystem 76, fusible member 70 may not melt. Therefore, monitoring system 102 may include a pulse extender in the form of charging circuit 127 on the output of op-amp 126, similar to charging circuit 122. Once op-amp 126 produces a high output signal, charging circuit 127 functions to ensure that the output signal remains high long enough to sufficiently discharge the charge storage devices to melt the fusible member. In the exemplary embodiment, charging circuit 127 includes a 0.47 µF capacitor 128 connected between the output of op-amp 126 and ground. When the output of op-amp 126 goes high, capacitor 128 charges to the output signal level. If the output of op-amp 126 returns low, the voltage across capacitor 128 discharges through 10 k resistor 129 with a time constant of approximately 4.7 ms. A diode 130, such as an 1N914 diode, prevents capacitor 128 from discharging through op-amp 126. The pulse extender insures that even a short contact with a single tooth will result in activation of the reaction system.

The above-described system is capable of detecting contact within approximately 50 µs and activating the reaction system. As described in more detail in U.S. Provisional Patent Application Ser. No. 60/225,056, filed Aug. 14, 2000, U.S. Provisional Patent Application Ser. No. 60/225,169, filed Aug. 14, 2000, and U.S. Provisional Patent Application Ser. No. 60/225,170, filed Aug. 14, 2000, in the context of a reaction system for braking a saw blade, a brake can be released in approximately less than 100 µs and as little as 20 µs. The brake contacts the blade in approximately one to approximately three milliseconds. The blade will normally come to rest within not more than 2-10 ms of brake engagement. As a result, injury to the operator is minimized in the event of accidental contact with the cutting tool. With appropriate selection of components, it may be possible to stop the blade within 2 ms, or less.

While exemplary embodiments of excitation system 101 and monitoring system 102 have been described above with specific components having specific values and arranged in a specific configuration, it will be appreciated that these systems may be constructed with many different configurations, components, and values as necessary or desired for a particular application. The above configurations, components, and values are presented only to describe one particular embodiment that has proven effective, and should be viewed as illustrating, rather than limiting, the invention.

Figure 4:
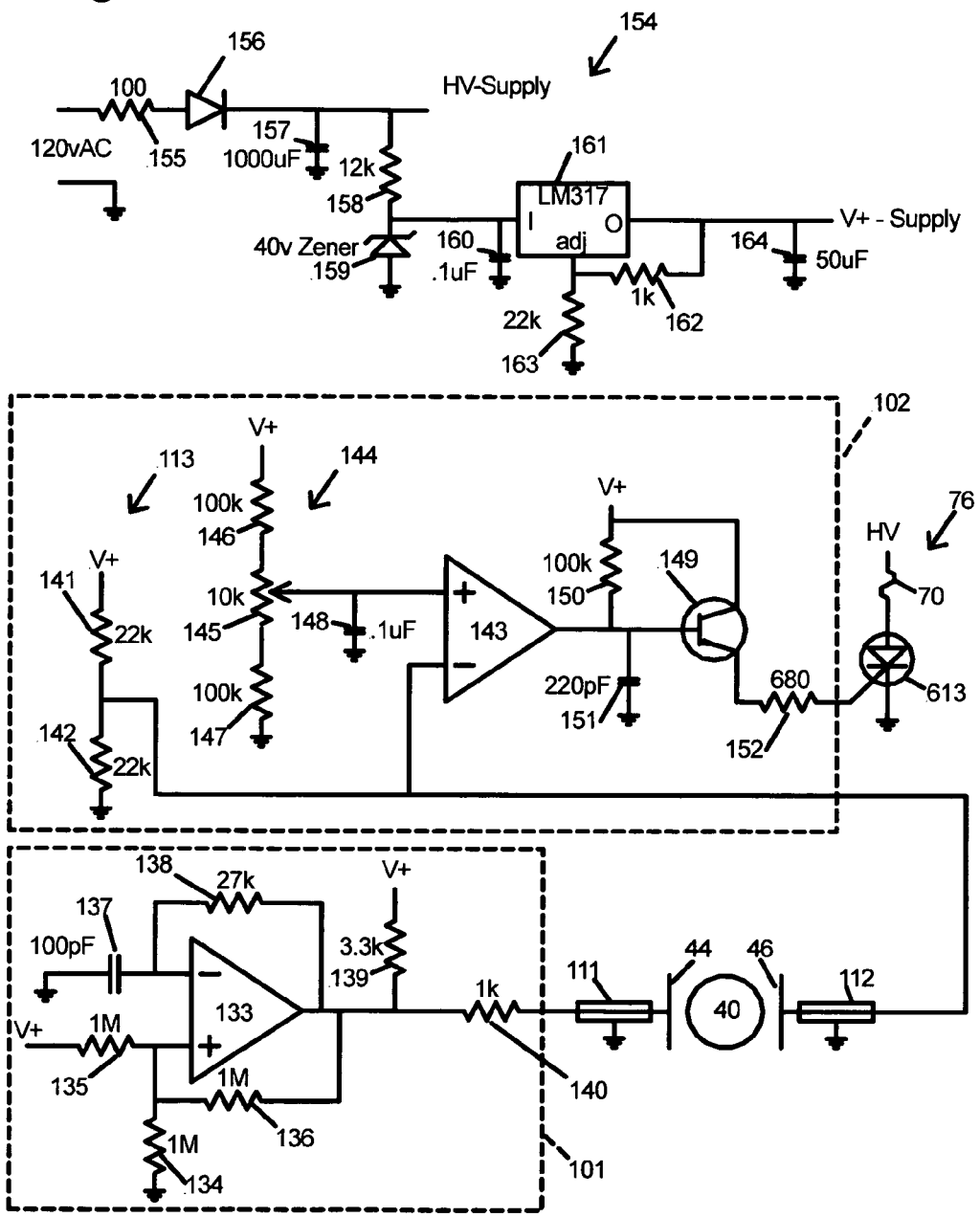
FIG. 4 is a schematic circuit diagram of a first alternative electronic subsystem for the safety system of FIG. 1, including an excitation system, a contact sense system and a firing system.

FIG. 4 shows alternative embodiments of excitation system 101 and monitoring system 102, as well as firing system 76, which is described in more detail in U.S. Provisional Patent Application Ser. No. 60/225,056, filed Aug. 14, 2000. Alternative excitation system 101 is configured to generate a square wave signal using only a single comparator 133 such as an LM393 comparator. A 1M resistor 134 is connected between the high input terminal of comparator 133 and ground. Another 1M resistor 135 is connected between the high input terminal of comparator 133 and a low voltage supply V. A 1M resistor 136 is connected between the high input terminal of the comparator and the output of the comparator. A 100 pF capacitor 137 is connected between the low input terminal of the comparator and ground. A 27 k resistor 138 is connected between the low input terminal of the comparator and the output of the comparator. A 3.3 k resistor 139 is connected between the low voltage supply V and the output of the comparator. The alternative oscillator circuit illustrated in FIG. 6 produces a square wave having a frequency of approximately 3-500 khz. A 1 k resistor 140 is connected between the output of the comparator and shielded cable 111 to reduce ringing. It will be appreciated that the values of one or more elements of alternative excitation system 101 may be varied to produce a signal having a different frequency, waveform, etc.

As in the exemplary embodiment described above, the signal generated by alternative excitation system 101 is fed through shielded cable 111 to charge plate 44. The signal is capacitively coupled to charge plate 46 via blade 40. Alternative monitoring system 102 receives the signal from charge plate 46 via shielded cable 112 and compares the signal to a reference voltage. If the signal falls below the reference voltage for approximately 25 an output signal is generated indicating contact between the blade and the user's body.

Alternative monitoring system 102 includes a voltage divider 113, which is formed of 22 k resistors 141 and 142. The voltage divider biases the signal received via cable 112 to half the low voltage supply V. The lower resistance of resistors 141, 142 relative to resistors 114, 115 serves to reduce 60 hz noise because low-frequency signals are attenuated. The biased signal is fed to the negative input terminal of a second comparator 143, such as an LM393 comparator. The positive terminal of comparator 143 is connected to reference voltage source 144. In the depicted embodiment, the reference voltage source is formed by a 10 kΩ potentiometer 145 coupled in series between two 100 kΩ resistors 146, 147 connected to the low voltage supply V and ground, respectively. A 0.1 g capacitor 148 stabilizes the output of the reference voltage.

As before, the reference voltage is used to adjust the trigger point.

The output of second comparator 143 is connected to the base terminal of an NPN bipolar junction transistor 149, such as a 2N3904 transistor. The base terminal of transistor 149 is also connected to low voltage supply V through a 100 k resistor 150, and to ground through a 220 pF capacitor 151. Potentiometer 145 is adjusted so that the voltage at the positive terminal of comparator 143 is slightly lower than the high peak of the signal received at the negative terminal of the second comparator when there is no contact between the blade and the user's body. Thus, each high cycle of the signal causes the second comparator output to go low, discharging capacitor 151. So long as there is no contact between the blade and the user's body, the output of the second comparator continues to go low, preventing capacitor 151 from charging up through resistor 150 and switching transistor 149 on. However, when the user's body contacts the blade or other isolated element, the signal received at the negative terminal of the second comparator remains below the reference voltage at the positive terminal and the output of the second comparator remains high. As a result, capacitor 151 is able to charge up through resistor 150 and switch transistor 149 on.

The collector terminal of transistor 149 is connected to low voltage supply V, while the emitter terminal is connected to 680Ω resistor 152. When transistor 149 is switched on, it supplies an output signal through resistor 152 of approximately 40 mA, which is fed to alternative firing system 76. As described in more detail in U.S. Provisional Patent Application Ser. No. 60/225,056, filed Aug. 14, 2000, the alternative firing circuit includes fusible member 70 connected between a high voltage supply HV and an SCR 613, such as an NTE 5552 SCR. The gate terminal of the SCR is connected to resistor 152. Thus, when transistor 149 is switched on, the approximately 40 mA current through resistor 152 turns on SCR 613, allowing the high voltage supply HV to discharge to ground through fusible member 70. Once the SCR is switched on, it will continue to conduct as long as the current through fusible member 70 remains above the holding current of approximately 40 mA, even if the current to the gate terminal is removed. Thus, the SCR will conduct current through the fusible member until the fusible member is melted or the high voltage source is exhausted or removed. The fact that the SCR stays on once triggered allows it to respond to even a short pulse through resistor 152.

FIG. 4 also illustrates an exemplary electrical supply system 154 configured to provide both low voltage supply V and high voltage supply HV from standard 120VAC line voltage. Electrical supply system 154 is connected to provide low voltage supply V and high voltage supply HV to alternative excitation system 101, alternative monitoring system 102, and alternative firing system 76. The line voltage is connected through a 100Ω resistor 155 and a diode 156, such as a 1N4002 diode, to a 1000 μF charge storage capacitor 157. The diode passes only the positive portion of the line voltage, thereby charging capacitor 157 to approximately 160V relative to ground. The positive terminal of capacitor 157 serves as the high voltage supply HV connected to fusible link 70. When SCR 613 is switched on upon detection of contact between the blade and the user's body, the charge stored in capacitor 157 is discharged through the fusible link until it melts. It will be appreciated that the size of capacitor 157 may be varied as required to supply the necessary current to melt fusible member 70. As described in U.S. Provisional Patent Application Ser. No. 60/225,056, filed Aug. 14, 2000, use of a HV capacitor leads to a much higher current surge, and therefore a faster melting of the fusible member than is the case with a low voltage system.

The positive terminal of capacitor 157 also provides a transformer-less source of voltage for low voltage supply V, which includes a 12 k resistor 158 connected between the positive terminal of capacitor 157 and a reverse 40V Zener diode 159. Diode 159 functions to maintain a relatively constant 40V potential at the junction between the diode and resistor 158. It can be seen that the current through the 12 k resistor will be about 10 mA. Most of this current is used by the low voltage circuit, which has a relatively constant current demand of about 8 mA. Note that while resistor 158 and diode 159 discharge some current from capacitor 157, the line voltage supply continuously recharges the capacitor to maintain the HV supply. A 0.1 g capacitor 160 is connected in parallel with diode 159 to buffer the 40V potential of the diode, which is then connected to the input terminal of an adjustable voltage regulator 161, such as an LM317 voltage regulator. The ratio of a 1 k resistor 162 connected between the output terminal and adjustment terminal, and a 22 k resistor 163 connected between the adjustment terminal and ground, set the output voltage of regulator 161 to approximately 30VDC. A 50 μF capacitor 164 is connected to the output terminal of regulator 161 to buffer sufficient charge to ensure that low voltage supply V can provide the brief 40 mA pulse necessary to switch on SCR 613. The described low voltage source is advantageous because of its low cost and low complexity.

It should be noted that when high voltage supply HV is discharged through fusible member 70, the input voltage to voltage regulator 161 may temporarily drop below 30V, thereby causing a corresponding drop in the low voltage supply V. However, since the reaction system has already been triggered, it is no longer necessary for the detection system to continue to function as described and any drop in low voltage supply V will not impair the functioning of safety system 18.

It will be appreciated by those of skill in the electrical arts that the alternative embodiments of excitation system 101, monitoring system 102, firing system 76, and electrical supply system 154 may be implemented on a single substrate and/or in a single package. Additionally, the particular values for the various electrical circuit elements described above may be varied depending on the application.

One limitation of the monitoring systems of FIGS. 3 and 4 is that they actuate the reaction system whenever the incoming amplitude from charge plate 46 drops below a preset threshold. Under most circumstances this represents a reliable triggering mechanism. However, when cutting green wood, a substantial additional capacitive and resistive load is coupled to the blade. The moisture in green wood gives it a very high dielectric constant, and an increased conductivity relative to dry wood. In fact, when cutting very green wood, i.e. over 50% moisture content, the amplitude of the signal on charge plate 46 can drop to a level equivalent to what is seen when a user contacts the blade. Thus, the systems of FIGS. 3 and 4 are limited in their ability to offer protection while processing green wood.

Figure 5:
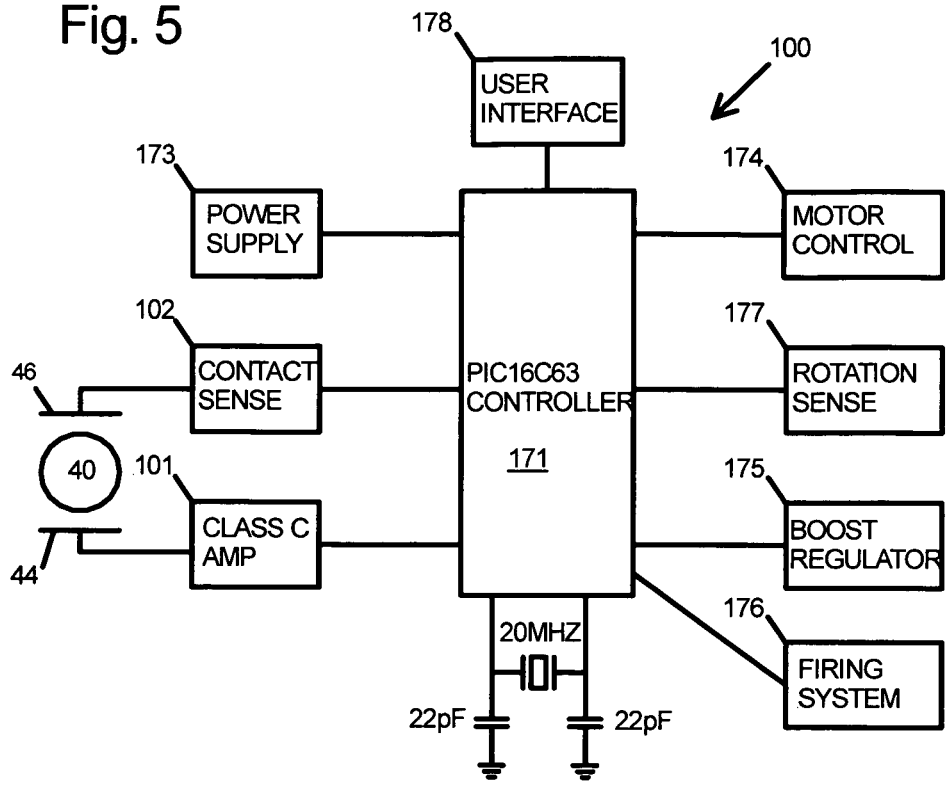
FIG. 5 is a block diagram illustrating the arrangement of a second alternative electronic subsystem.

Another embodiment of an electronic subsystem 100 adapted to accommodate green wood and offering certain other benefits is shown in FIGS. 5-13. As shown in FIG. 5, system 100 includes an excitation system 101 in the form of a class-C amplifier connected to a micro-controller 171. System 100 also includes a monitoring system 102 in the form of a contact sense circuit connected to controller 171. A power supply 173 supplies power to the various elements of system 100. A motor controller 174 is adapted to turn a motor off and on based on signals from the controller. A boost regulator 175 operates to charge a firing system 176. A rotation sense circuit 177 detects rotation of the cutting tool. Lastly, a user interface 178 is provided to allow a user to control operation of the saw and provide feedback on the status of the system.

Figure 6:
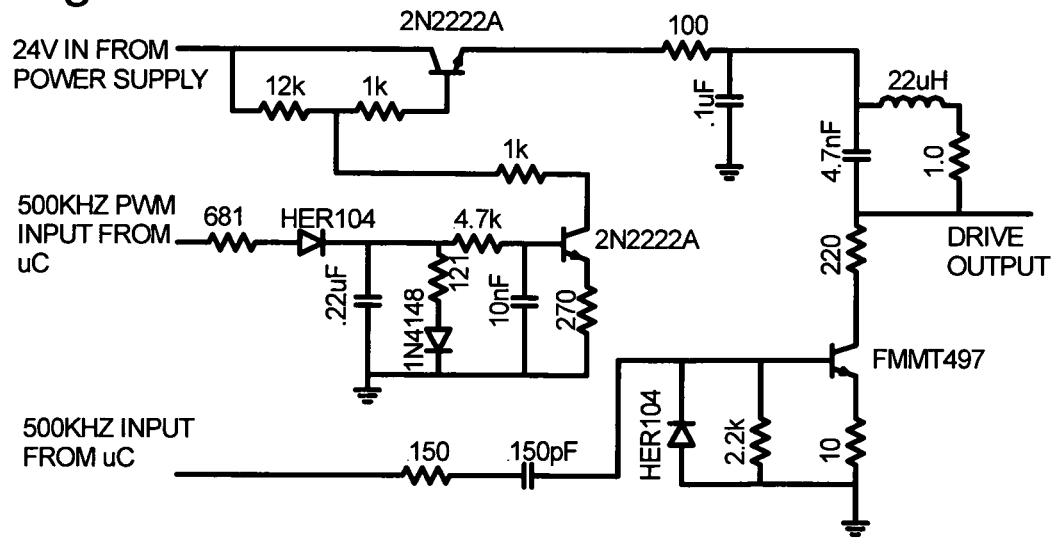
FIG. 6 is a schematic diagram of an excitation system of the subsystem of FIG. 5.

FIG. 6 illustrates the circuitry of the class-C amplifier in more detail. The amplifier includes a drive output that is coupled to plate 44 as shown in FIG. 5. The drive output is sinusoidal at about 500 khz and the amplitude is adjustable between about 3 volts and 25 volts. A 24-volt input supply line from the power supply provides power for the amplifier. The base frequency is provided by a 500 khz square wave input from the controller. The amplitude is controlled by pulse width modulation from the controller.

The controller is programmed to adjust the drive voltage output from the amplifier to maintain a predetermined amplitude at plate 46 under varying capacitive loads. Thus, when cutting green wood, the controller ramps up the drive voltage to maintain the desired voltage on plate 46. The controller is preferably capable of skewing the drive voltage between about 1 and 50% per millisecond, and more preferably between 1 and 10%. This allows the system to maintain a constant output level under the varying load created while sawing green wood, or such as might be created by placing a conductive member such as a fence near the blade. The controller should preferably not skew the drive voltage by much more than 50% per millisecond, or it may counteract the drop in signal created by a user contact event.

Figure 7:
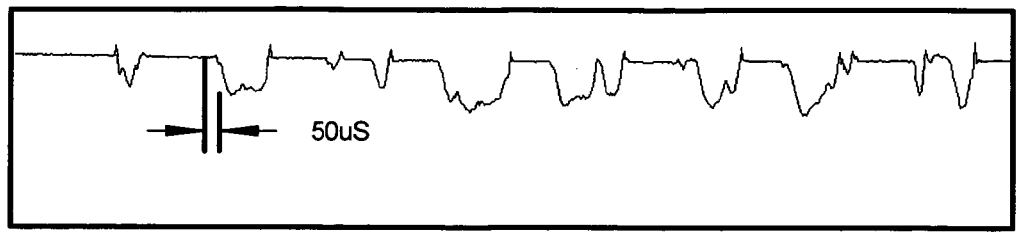
FIG. 7 shows an exemplary attenuation in signal that occurs when the finger of a user contacts a blade.

FIG. 7 illustrates the change in signal amplitude seen at plate 46 as the teeth of a 10-inch, 36-tooth saw blade spinning at 4000 rpm contacts a user's finger. Each of the drops in the signal amplitude is from a single tooth moving through the skin of the finger. It can be seen, for instance, that the signal amplitude drops by about 30% over about 50 $\mu$S as the second tooth strikes the finger. When cutting very green wood, the signal attenuation upon contact with a user will be more like 15%, but will occur over the same 50 $\mu$S. Therefore, as long as the system can detect a contact event of a 5-25% or greater drop in less than 100 $\mu$S, providing a skew rate of around 10% per millisecond should not override an actual event. It will be understood that the skew rate and trigger thresholds can be adjusted as desired. The primary limiting factor is that the trigger threshold should not be so small that noise creates false triggers, unless false triggers are acceptable.

Figure 8:
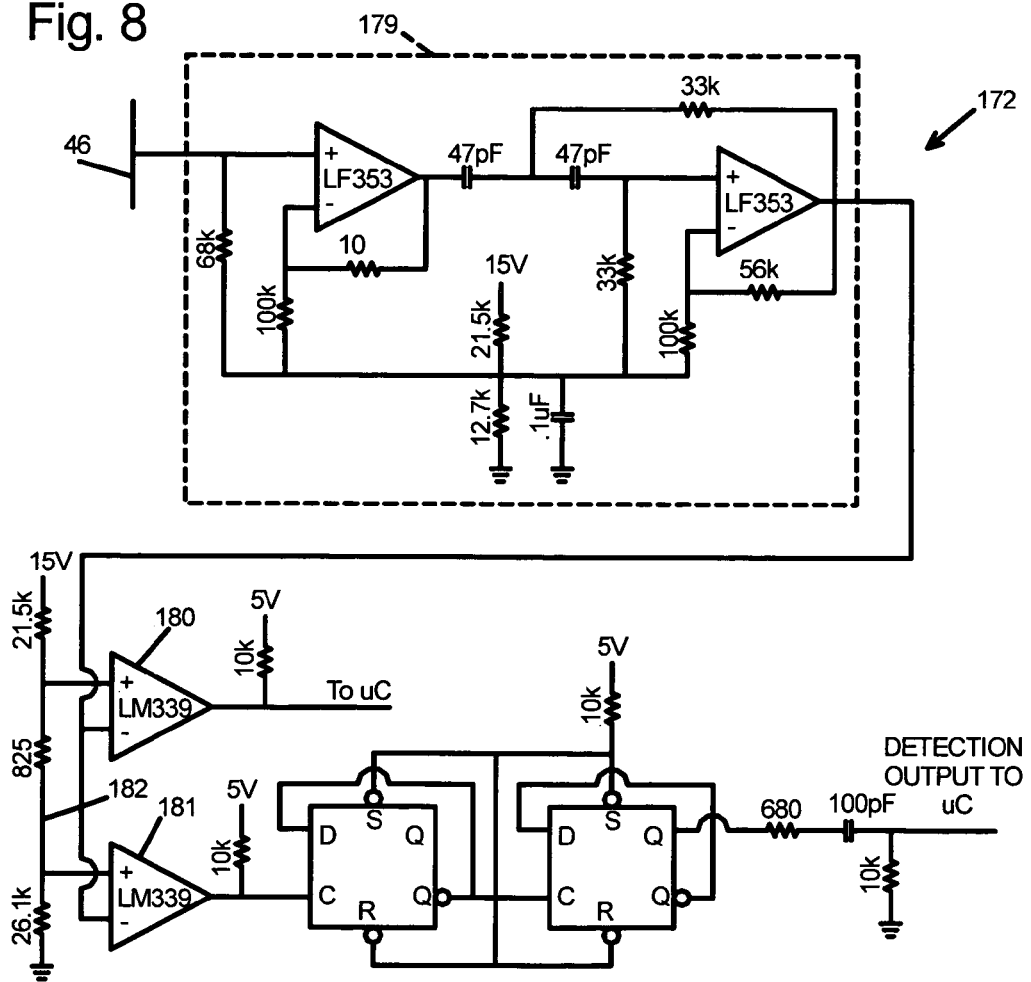
FIG. 8 is a schematic of a contact sense portion of the subsystem of FIG. 5.

FIG. 8 shows the details of the contact sense circuit. The contact sense circuit receives input from plate 46. In this embodiment, the preferred capacitive coupling between the blade and the plates is about 30 pF for the drive plate and about 10 pF for plate 46. The larger drive plate size provides improved signal transfer for a given total capacitance of both plates. The actual values are not critical, and equal values could be used as well. Generally speaking, the capacitance of the drive plate should be comparable to the human body capacitance to be detected, i.e. 10-200 pF.

The input from plate 46 is fed through a high-pass filter 179 to attenuate any low frequency noise, such as 60 hz noise, picked up by plate 46. Filter 179 can also provide amplification of the signal to a desired level as necessary. The output of the filter is fed into a set of comparators 180, 181. Comparator 180 pulses high briefly if the maximum signal amplitude from the filter exceeds the value at its positive input set by voltage divider 182. The output pulses from the comparator are fed to the controller. The controller samples over a 200 $\mu$S window and modulates the drive amplitude to attempt to maintain the sensed voltage at a level so that 50% of the waveform cycles generate a pulse through comparator 180. If less than 50% generate pulses, then the controller raises the drive voltage by a set amount. Likewise, if more than 50% generate pulses, the drive voltage is lowered. The system can be configured to step by larger or smaller amounts depending on the deviation from 50% observed during a particular window. For instance, if 45 pulses are observed, the system may step up the drive amplitude by 1%. However, if only 35 pulses are observed, the system may step by 5%. The system will continually "hunt" to maintain the proper drive level. By selecting the window duration and adjustment amount, it is possible to control the skew rate to the desired level as described above.

Comparator 181 pulses every cycle of the waveform so long as the sensed voltage exceeds a lower trigger threshold set by voltage divider 182. Therefore, under normal circumstances, this is a 500 khz pulse. The pulse output from comparator 181 is fed through a divide-by-four circuit formed by two D-flip flops to reduce the frequency to 125 khz—or an 8 $\mu$S period. The output of the divider is fed to the controller. The controller monitors this line to insure that a pulse occurs at least every 18 $\mu$S. Therefore, if more than about half of the pulses are missing in over an 18 $\mu$S period, the controller will trigger the reaction system. Of course, the particular period can be selected as desired to maximize reliability of contact detection and minimize false triggers. A benefit of the described arrangement is that a single pulse or even two may be missing, such as due to noise, without triggering the system. However, if more pulses are missing, the system will still be triggered reliably. The particular trigger level for missing pulses is set by the voltage divider. This level will typically be between 5 and 40% for the described system.

Figure 9:
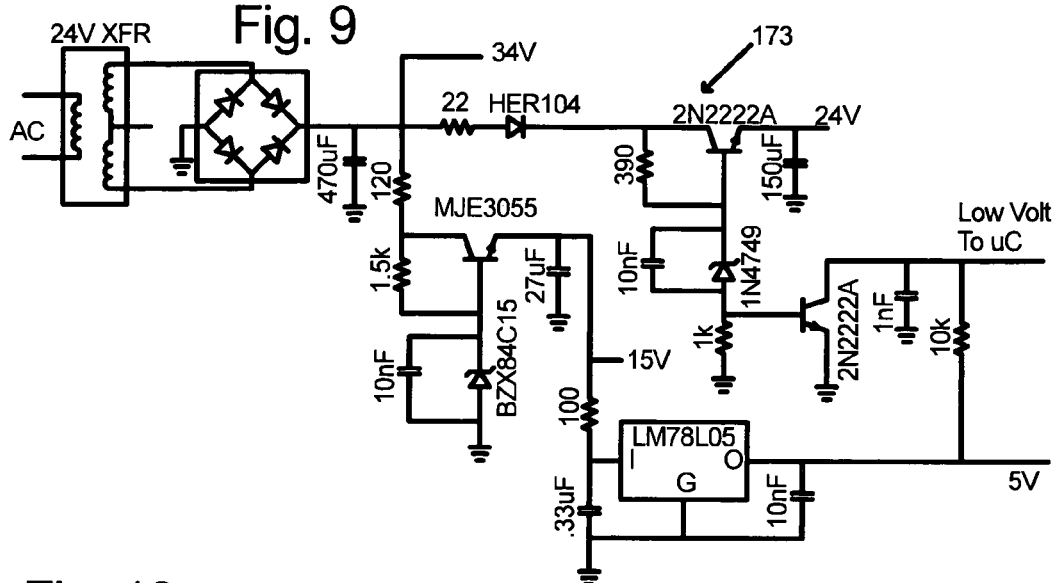
FIG. 9 is a schematic of a power supply of the subsystem of FIG. 5.

FIG. 9 illustrates the circuit of power supply 173. The power supply includes an unregulated 34-volt output and regulated 5, 15 and 24-volt outputs. The 24-volt output is used to power the excitation signal, which has a relatively large voltage, and the 34-volt output powers a capacitor charging circuit described below. The 5-volt output powers the controller and other logic circuitry, while the 15-volt output operates most of the analog electronics. A low-voltage output is monitored by the controller to insure that adequate voltage is present to operate the system.

Figure 10:
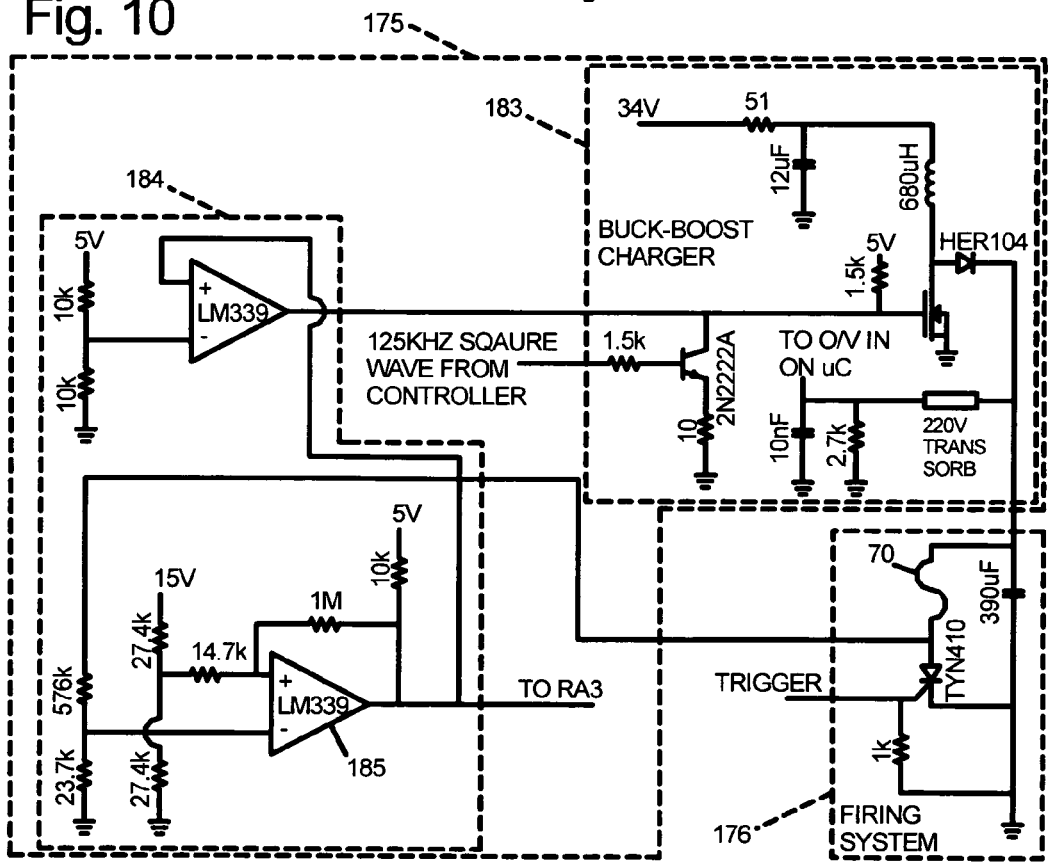
FIG. 10 is a schematic of a boost regulator portion and a firing portion of the subsystem of FIG. 5.

Boost regulator 175 and firing system 176 are shown in FIG. 10. Boost regulator 175 includes a buck-boost charger 183 that steps up the 34-volt supply input to 180 volts for charging the firing circuit. The controller provides a 125 khz input to modulate the buck-boost cycle of the charger. A regulator circuit 184 monitors the voltage from the firing circuit and turns the charger on or off as necessary to maintain the charge near 180 volts. The regulator circuit is constructed with a predetermined amount of hysteresis so that the charger will turn on when the firing circuit voltage falls below 177 volts and turn off when the voltage reaches 180 volts, as set by the voltage divider inputs and feedback to comparator 185. The output of comparator 185 is fed to the controller. By monitoring the charge and discharge time based on the state of the output of comparator 185, the controller can verify that the capacitor in the firing circuit is operating properly and storing adequate charge. An overvoltage circuit uses a 220V transient suppressor to signal the controller if the voltage on the capacitor exceeds about 220V. This testing is described in more detail in U.S. Provisional Patent Application Ser. No. 60/225,059, filed Aug. 14, 2000. The firing circuit is described in more detail in U.S. Provisional Patent Application Ser. No. 60/225,056, filed Aug. 14, 2000.

Figure 11:
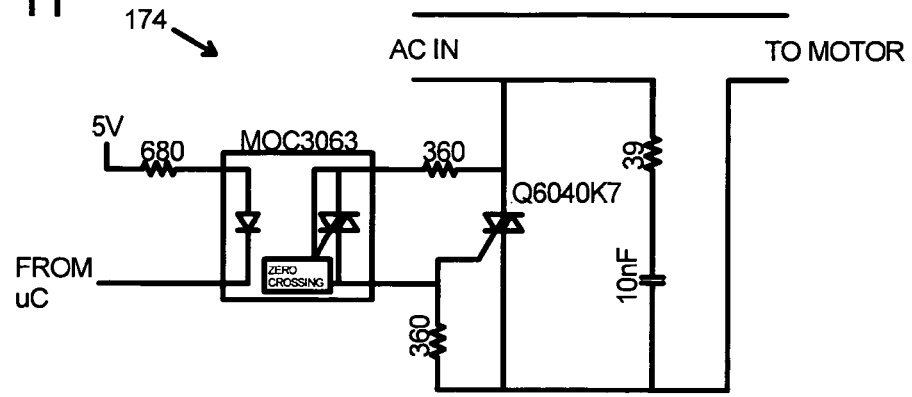
FIG. 11 is a schematic of a motor control portion of the subsystem of FIG. 5.

FIG. 11 illustrates the circuitry of motor control 174. The motor control receives a logic level control signal from the controller to turn the motor on and off based on input from the user interface, described in more detail below. The motor control also turns off the motor when a trigger event occurs.

The logic signal is electrically isolated from the motor voltage by an optoisolated triac driver. This isolates the ground of the detection system from the ground of the motor power. A mechanical relay or similar device can also be used and will provide the same isolation. When the optoisolated triac drive receives a signal from the controller, it turns on Q6040K7 triac to provide power to the machine.

Figure 12:
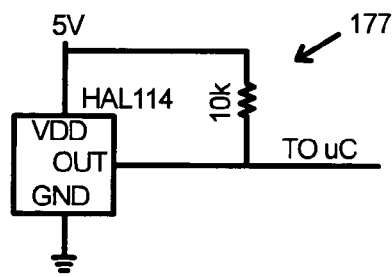
FIG. 12 is a schematic of a rotation sensor portion of the subsystem of FIG. 5.

The rotation sense circuit is shown in FIG. 12. The purpose of the rotation sense circuit is to insure that the contact detection system is not turned off until the cutter or blade as stopped. The rotation sense circuit utilizes a hall-effect sensor that is located adjacent a rotating portion of the machine. A small magnet is inserted in the rotating portion to signal the hall-effect sensor. Output of the hall-effect sensor is fed to the controller. As described in more detail in U.S. Provisional Patent Application Ser. No. 60/225,059, filed Aug. 14, 2000, the controller monitors the output of the hall-effect sensor to determine when the cutter has coasted to a stop. Once the cutter stops, any sensed contact will no longer trigger the reaction system. It should be noted that rotation of the cutter could be detected by other arrangements as well. Various suitable mechanisms are described in U.S. Provisional Patent Application Ser. No. 60/225,094, filed Aug. 14, 2000.

For instance, a small eccentricity can be placed on the cutter or some other isolated structure that rotates with the cutter, such as the arbor. This eccentricity can be placed to pass by sense plate 46 or by a separate sensing plate. The eccentricity will modulate the detected signal amplitude so long as the cutter is rotating. This modulation can be monitored to detect rotation. If the eccentricity is sensed by sense plate 46, it should be small enough that the signal modulation generated will not register as a contact event. As another alternative, rotation can be sensed by electromagnetic feedback from the motor.

Controller 171 may also be designed to monitor line voltage to insure that adequate voltage is present to operate the system. For instance, during motor start up, the AC voltage available to the safety system may drop nearly in half depending on the cabling to the saw. If the voltage drops below a safe level, the controller can shut off the saw motor. Alternatively, the controller may include a capacitor of sufficient capacity to operate the system for several seconds without power input while the saw is starting.

Figure 13:
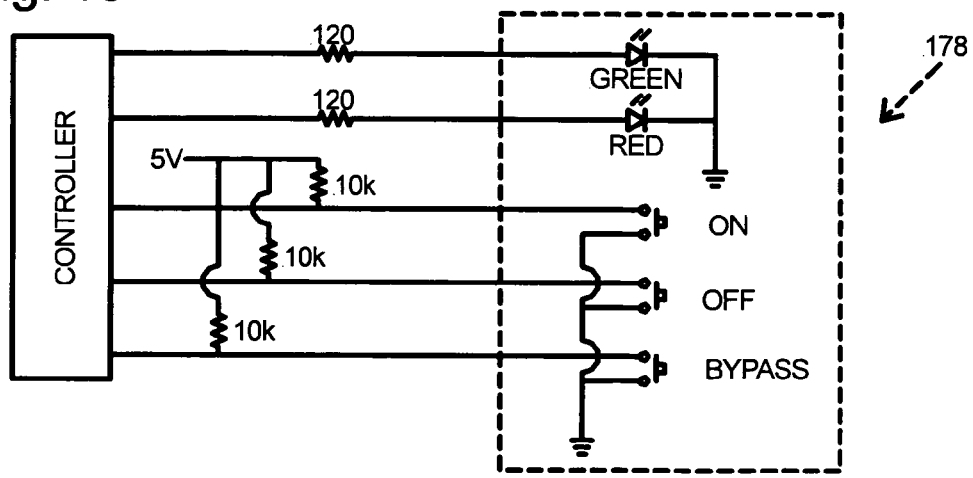
FIG. 13 is a schematic of a user interface portion of the subsystem of FIG. 5.

User interface 178 is shown in FIG. 13. The user interface includes start, stop and bypass buttons that are used to control the operation of the saw. The bypass button allows the user to disable the contact detection system for a single on/off cycle of the saw so as to be able to saw metal or other materials that would otherwise trigger the reaction system. The user interface also includes red and green LED's that are used to report the status of the system to a user. More details on the operation of suitable user interfaces are described in U.S. Provisional Patent Application Ser. No. 60/225,059, filed Aug. 14, 2000.

Figure 14:
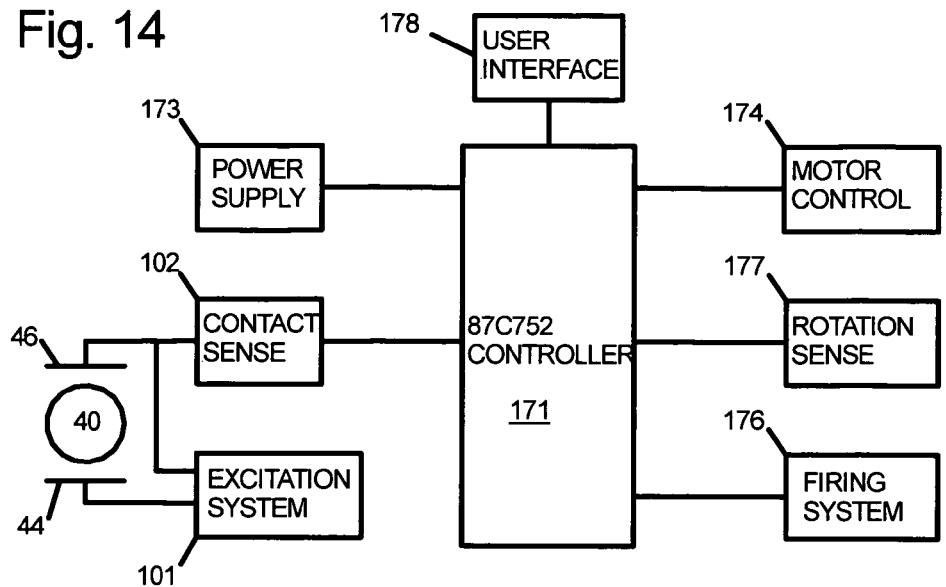
FIG. 14 is a block diagram of second and third alternative electronic subsystems.
Figure 15:
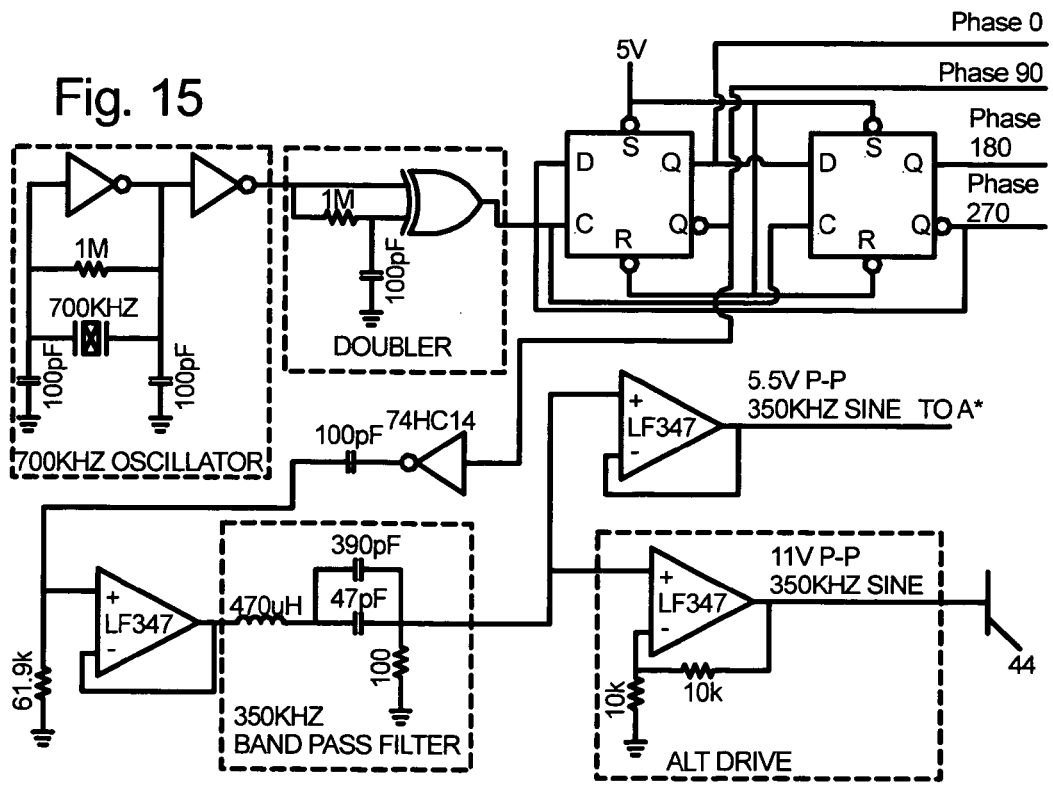
FIG. 15 is a schematic of an excitation system portion of the subsystems of FIG. 14.

Two additional electronic configurations for detection subsystem 22 are shown in FIGS. 14-18. As illustrated in FIG. 14 the alternative detection systems utilize a micro-controller 171 to manage and monitor various functions. An excitation system delivers a 350 khz sine wave drive signal through plate 44 to the blade. The circuit for generating the drive signal is illustrated in FIG. 15. The excitation circuit uses a 700 khz oscillator with an output fed into a doubler to generate a 1.4 Mhz signal. The output of the doubler is fed into a set of S-R flip-flops to extract phase signals at 90-degree intervals. The phase signals are used to drive a synchronous detection system that forms one of the two embodiments of FIGS. 14-18 and is shown in more detail in FIG. 17. The 350 khz square wave 180-degree phase signal is fed through an inverter and a buffer amplifier into a Q=10,350 khz band pass filter.

Figure 16:
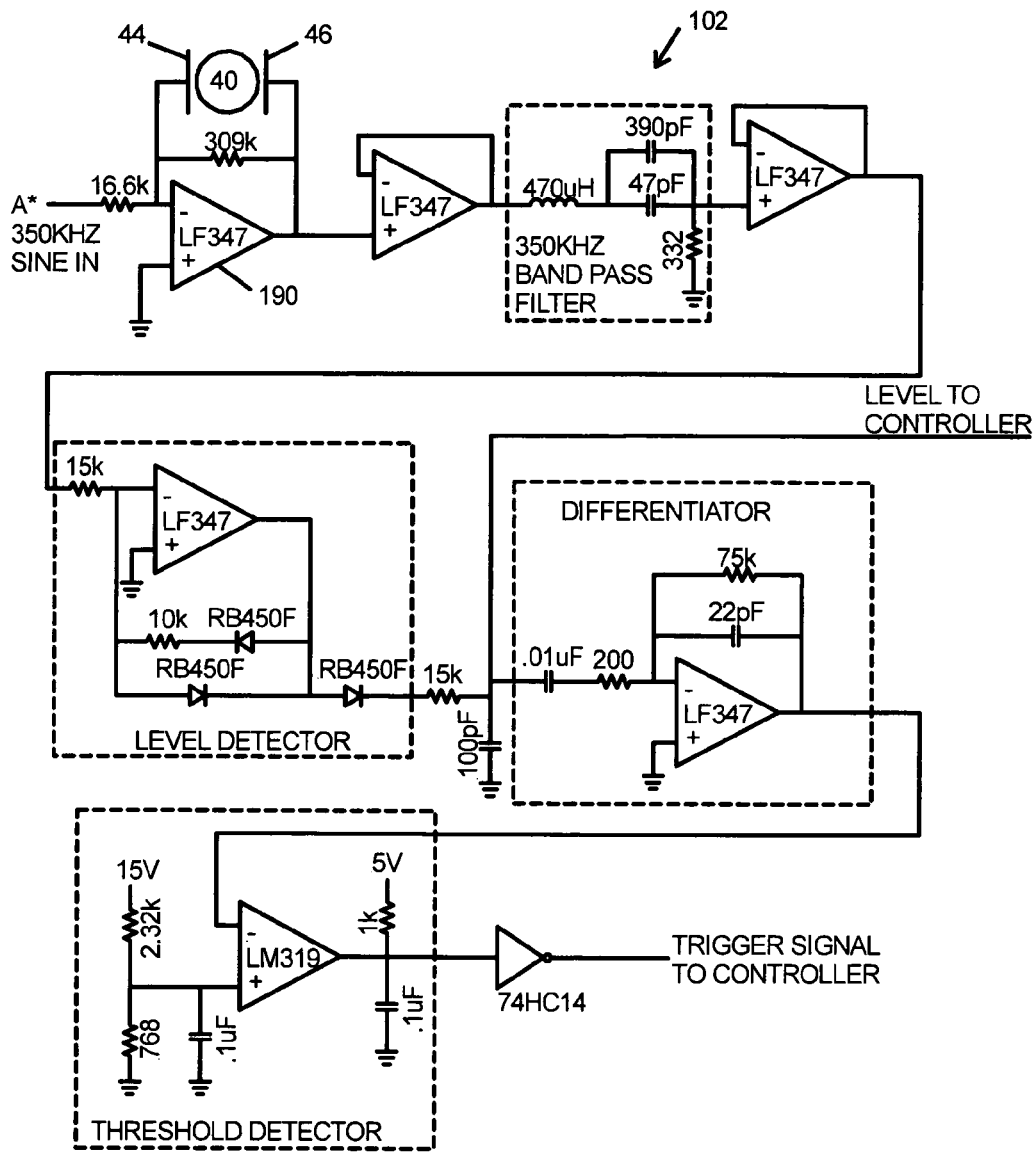
FIG. 16 is a schematic of a contact sense portion of the second alternative subsystem of FIG. 14.

The output of the band pass filter is a 350 khz sine wave that is fed through another buffer amplifier to a sense amplifier 190 shown in FIG. 16. The output of the sense amplifier is fed to plate 44 and the input from plate 46 is fed back to the negative input. When a user touches cutter 40, the feedback on the sense amplifier is reduced, thereby causing the output amplitude to go up. The result of this arrangement is that the drive amplitude on the blade is small during normal use and rises only when a user touches the blade or green wood is cut. In this embodiment, the preferred capacitive coupling of the plates to the blade is about 90 pF each, although other values could be used.

The output of the sense amplifier is fed through a buffer and into a 350 khz band pass filter to filter out any noise that may have been picked up from the blade or plates. The output of the band pass filter is fed through a buffer and into a level detector. The level detector generates a DC output proportional to the amplitude of the sense amplifier. The output of the level detector is smoothed by an RC circuit to reduce ripple and fed into a differentiator. The differentiator generates an output proportional to the rate of change of the sense amplifier output amplitude.

As mentioned above, the sense amplifier output only changes when a user touches the blade or green wood is cut. The change when cutting green wood is slow relative to what happens when a user touches the blade. Therefore, the differentiator is tuned to respond to a user contact, while generating minimal response to green wood. The output of the differentiator is then fed to a comparator that acts as threshold detector to determine if the output of the differentiator has reached a predetermined level set by the a voltage divider network. The output of the threshold detector is fed through a Schmitt-trigger that signals the controller that a contact event has occurred. An RC network acts as a pulse stretcher to insure that the signal lasts long enough to be detected by the controller.

The output from the level detector is also fed to an analog-to-digital input on the controller. It may be that the under some circumstances, such as while cutting extremely green wood, the response of the sense amplifier will be near saturation. If this happens, the amplifier may no longer be capable of responding to a contact event. In order to provide a warning of this situation, the controller monitors this line to make sure that the detected level stays low enough to allow a subsequent contact to be detected. If an excess impedance load is detected, the controller can shut down the saw without triggering the reaction system to provide the user with a warning. If the user wants to continue, they can initiate the bypass mode as described above.

Figure 17:
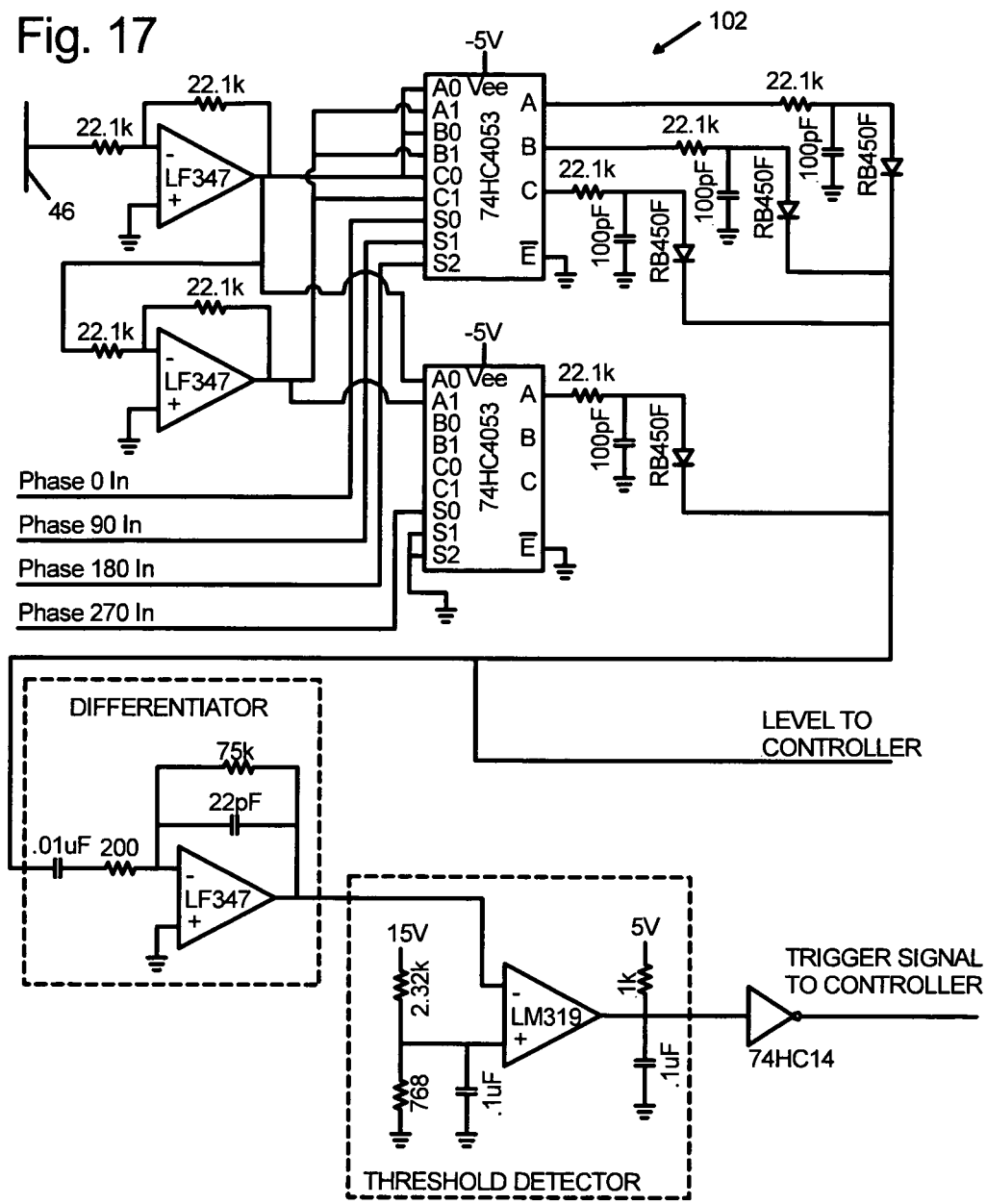
FIG. 17 is a schematic of a contact sense portion of the third alternative subsystem of FIG. 14.

The second of the two alternative detection systems of FIGS. 14-18 is a synchronous detector that uses the phase information generated by the flip-flops in FIG. 15. This system drives plate 44 through the ALT DRIVE circuit shown in FIG. 15. This ALT DRIVE circuit and the detection circuit of FIG. 17 are substituted for the circuit of FIG. 16. As shown in FIG. 17, the signal from plate 46 is fed through a pair of buffer/amplifiers into a set of analog switches. The switches are controlled by the phase information from the flip-flops. This arrangement generates an output signal that is proportional to the amplitude of the signal detected from plate 46 with improved noise immunity because of the synchronous detection. The output signal is fed into a differentiator and threshold detector circuit as previously described. These circuits send a trigger signal to the controller when the detected signal amplitude drops at a rate sufficient for the differentiator to have an output exceeding the threshold level.

Figure 18:
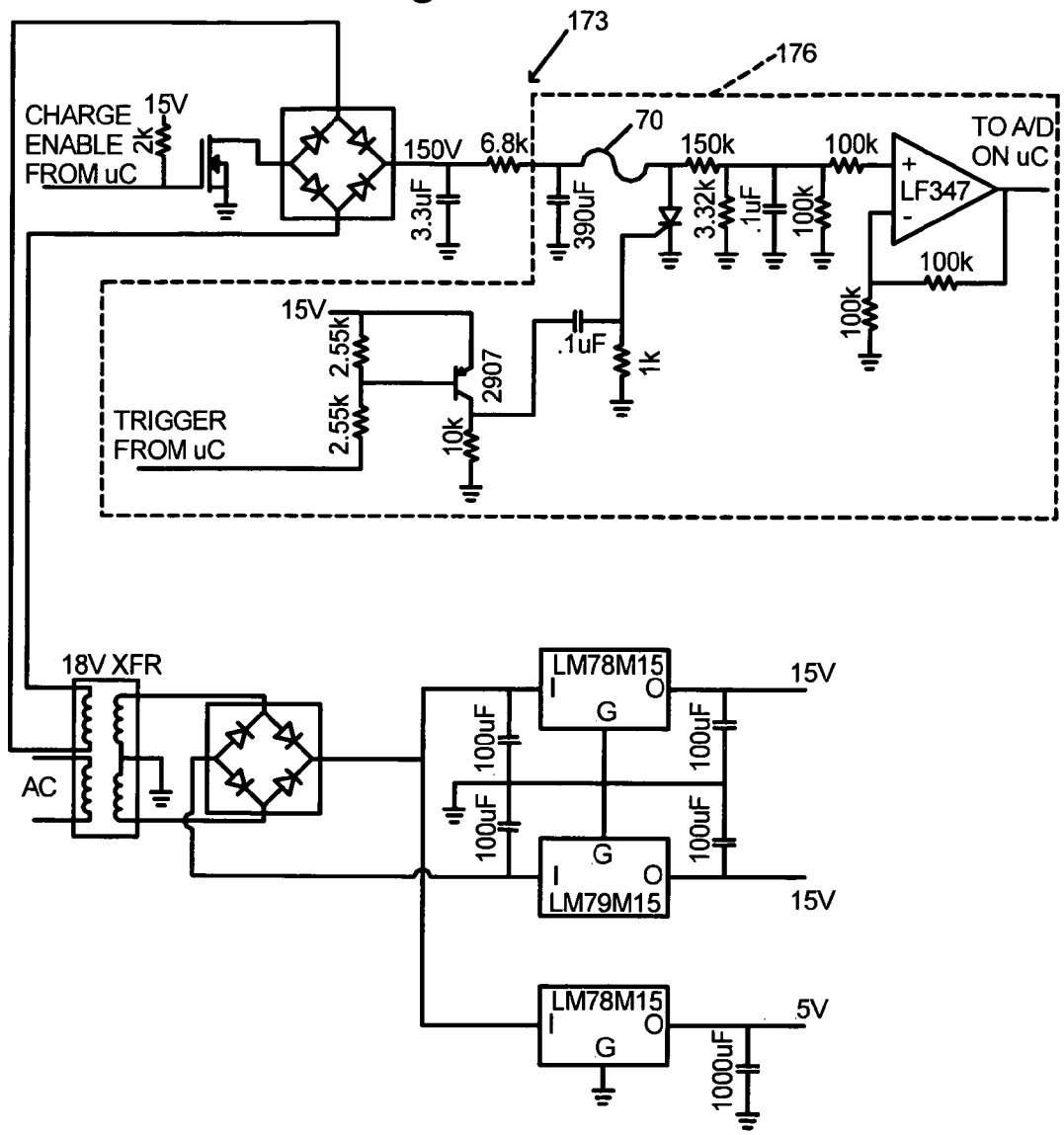
FIG. 18 is a schematic of a power supply and firing system portion of the subsystems of FIG. 14.

FIG. 18 illustrates a power supply and firing system suited for use in these two alternative arrangements. The power supply generates plus and minus 15-volt levels, as well as a 5-volts level. The capacitor in the firing circuit is charged by a secondary input winding on the power transformer. This arrangement provides for isolation of the system ground from the machine ground and avoids the need to step up power supply voltage to the capacitor voltage as accomplished by boost regulator 175. However, the capacitor charge voltage becomes dependent on the line voltage, which is somewhat less predictable.

The charging circuit for the capacitor is regulated by an enable line from the controller. By deactivating the charging circuit, the controller can monitor the capacitor voltage through an output to an A/D line on the controller. When the capacitor is not being charged, it should discharge at a relatively known rate through the various paths to ground. By monitoring the discharge rate, the controller can insure that the capacitance of the capacitor is sufficient to burn the fusible member. The trigger control from the controller is used to fire the SCR to burn the fusible member.

With any of the above electronic subsystems, it is possible to avoid triggering in the event metal or metal-foiled materials are cut by looking for the amplitude of the signal, or the rate of change, depending on the system, to fall within a window or band rather than simply exceeding or falling below a certain threshold. More particularly, when metal is cut, the detected signal will drop to almost zero, and will drop within a single cycle. Thus, the controller or threshold detection circuitry can be configured to look for amplitude change of somewhat less than 100%, but more than 10% as a trigger event, to eliminate triggering on metal or other conductive work pieces which would normally substantially completely ground the signal.

It should be noted that, although not essential, all of the described embodiments operate at a relatively high frequency—above 100 khz. This high frequency is believed to be advantageous for two reasons. First, with a high frequency, it is possible to detect contact more quickly and sample many cycles of the waveform within a short period of time. This allows the detection system to look for multiple missed pulses rather than just one missed pulse, such as might occur due to noise, to trigger the reaction system. In addition, the higher frequency is believed to provide a better signal to noise ratio when cutting green wood, which has a lower impedance at lower frequencies.

INDUSTRIAL APPLICABILITY

The present invention is applicable to power equipment, and specifically to safety systems for power equipment.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions.

Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A woodworking machine comprising:
   a support structure;
   a motor supported by the support structure;
   a blade assembly including a blade with cutting teeth, where the blade assembly is supported by the support structure and moveable by the motor, and where the blade assembly is electrically isolated from the support structure;
   a reaction system adapted to perform an action to mitigate injury if a person contacts the blade; and
   a contact detection system to detect contact between the blade assembly and a person, where the contact detection system includes circuitry adapted to generate a drive signal, to apply the drive signal to the blade assembly, and to detect a change in the electrical signal on the blade assembly due to an electrical load applied to the blade assembly, where the contact detection system is adapted to trigger the reaction system when the electrical load applied to the blade assembly is sufficient to lower the electrical signal on the blade assembly to a predetermined amplitude over a predetermined period of time, and where the contact detection system is further adapted to adjust the drive signal to try and maintain a predetermined electrical signal amplitude on the blade assembly in the presence of changing electrical load applied to the blade assembly by cutting wet wood.

2. The machine of claim 1 where the electrical load on the blade assembly sufficient to lower the electrical signal to the predetermined level over the predetermined period of time corresponds to a threshold electrical load, and where the threshold electrical load adjusts with the drive Signal.

3. The machine of claim 1 where the electrical load on the blade assembly sufficient to lower the electrical signal to the predetermined level over the predetermined period of time corresponds to a threshold electrical load, and where a higher threshold electrical load is required to trigger the reaction system when cutting-wet wood than when cutting dry wood due to the drive signal increasing to compensate for the electrical load on the blade assembly due to the wet wood.

4. The machine of claim 1 where the predetermined amplitude is such that the electrical load applied to the blade assembly by cutting wet wood is sufficient to lower the electrical signal on the blade assembly to the predetermined amplitude but not over the predetermined period of time.

* * * * *

UNITED STATES PATENT AND TRADEMARK OFFICE
CERTIFICATE OF CORRECTION

PATENT NO. : 8,438,958 B2  
APPLICATION NO. : 13/374290  
DATED : May 14, 2013  
INVENTOR(S) : Stephen F. Gass et al.

Page 1 of 1

It is certified that error appears in the above-identified patent and that said Letters Patent is hereby corrected as shown below:

In the Claims:

Claim 2, column 18, line 49, delete "Signal" and insert --signal--.

Claim 3, column 18, line 55, delete "cutting-wet" and insert --cutting wet--.

Signed and Sealed this  
Seventeenth Day of September, 2013

Teresa Stanek Rea  
*Deputy Director of the United States Patent and Trademark Office*